United States Patent [19]

Weddle et al.

[11] Patent Number: 4,937,822
[45] Date of Patent: Jun. 26, 1990

[54] SKYWAVE ADAPTABLE COMMUNICATION APPARATUS

[75] Inventors: Daniel O. Weddle, Plano; Bill C. Miller, Allen; Melvin G. Bebee; Charles D. Young, both of Richardson; Stephen W. Cable, Plano, all of Tex.

[73] Assignee: Rockwell International Corporation, El Segundo, Calif.

[21] Appl. No.: 371,906

[22] Filed: Jun. 27, 1989

[51] Int. Cl.⁵ ................................................ H04J 4/00
[52] U.S. Cl. ...................................... 370/124; 370/76; 370/50
[58] Field of Search ........................ 370/76, 124, 50; 375/38; 455/62

[56] References Cited

U.S. PATENT DOCUMENTS 4,066,964 1/1978 Costanza et al. ...................... 375/38
4,780,885 10/1988 Paul et al. .............................. 455/62

Primary Examiner—Douglas W. Olms
Assistant Examiner—Christopher O. Edwards

Attorney, Agent, or Firm—Bruce C. Lutz; V. Lawrence Sewell; H. Fredrick Hamann

[57] ABSTRACT

An adaptive TDMA (time division multiple access) communication system is illustrated which dynamically maintains potentially different frequencies between nodes of the communication system using a process of communicating the quality of received signals between the nodes and storing this information so that an optimum frequency band can be selected whereby whenever signal quality deteriorates, an alternate frequency can be selected to provide continued communications. An embodiment of the system spans both high frequency (HF) and very high frequency (VHF) to establish the communications through atmospheric induced refractions (reflections) beyond line of sight between directly communicating nodes of the system. Further, the system uses frequency hopping both for signal transmission security and for node identification. When a node is traffic idle and also on a periodic maintenance basis, frequency bands other than the traffic frequency are analyzed for potential future use.

16 Claims, 13 Drawing Sheets

SKYWAVE ADAPTABLE COMMUNICATION APPARATUS

THE INVENTION

The present invention is concerned generally with electronics and more specifically with communication systems. Even more specifically, the invention is concerned with a multinode communication system using information packets to pass information from one node to a remote node through a series of intermediate transmissions between the given node and at least one of its predefined neighbors.

BACKGROUND

The present invention relates to skywave communication systems. By skywave, we mean that communication which is supported by ionized regions above the earth. Such communication is characteristic of high frequency (HF) but it also occurs at even higher frequencies. One such higher band is typically designated as very high frequency (VHF).

HF is a traditional approach for economical, non-line of sight communications. However, existing HF communication systems exhibit problems for reliable and economical use.

One problem concerns the behavior of the HF medium. The frequencies supported by the medium, the signal attenuation, and the noise level are all variable with time. General tendencies over long periods (daily, yearly and solar cycle periods) are known, but short term variations, say over a few minutes or few hours, occur in an apparently random fashion. In the past, an efficient use of the medium required operators with considerable skill and experience to recognize channel changes and to estimate what an appropriate remedial response might be. Skilled operators are a limited resource and there is a need for systems that can be effectively employed by any user. Also, as sophistication and transmission techniques are applied (such as frequency hopping for security purposes) limitations occur for even the best operators to manually operate and optimize the system. A second problem in the prior art concerns the need for interconnecting a number of HF nodes. If a given node is to be connected to "N" neighbors, then the node must have N radio terminals or it must share one or several radio terminals among the N neighbors. Each of these N radio links will individually exhibit the medium variations described above. Systems exist to accomplish sharing via scanning techniques that lock onto a calling node but it is desirable to develop a means for sharing that prevents blocking of signal transmissions, or in other words, is non-blocking.

The present invention attempts to overcome the limitations of the prior art by using time division multiple access (TDMA) to share a given radio at a given node among the links connecting to its neighbors. In the embodiment illustrated herein, a single radio located at each node is directly connected to four neighbors. However, the overall design structure accommodates other numbers of neighbors and permits the use of one or more radios at any of the nodes. The primary function of the system is to automatically establish and maintain connectivity between nodes of the system. When properly connected, the basic modem/radio terminal can accept and deliver messages in accordance with automated link management algorithms. Connectivity is established and maintained through a series of protocols that search a frequency spectrum, measure the channel parameters and adaptively match transmission parameters such as data rate to the channel. A channel maintenance protocol is activated on a routine basis or whenever significant changes are sensed in the measured channel characteristics. Connectivity is initiated with a synchronized link-up sequence in which transmission occurs on a predefined library of frequencies in the time slots associated with those neighbors for which connectivity is being sought. The receiving node reports on the link quality of the probes in the link-up sequence as received by that node using a synchronized response on its library of frequencies. As a result of this exchange, each node knows the frequency on which reception of its transmissions was optimum as well as the relative quality of alternate frequencies. At this point, an automated handshake procedure confirms the selection of the frequencies to be used for subsequent transactions. These are designated as "orderwire" frequencies. At the conclusion of this process, the link is declared connected and ready for traffic.

In this TDMA system, the activities on any given link, which is defined by a frequency/time slot, are independent from those occurring in other time slots. Thus, a node may be in some stage of the connect procedure with some of its neighbors, in traffic ready status with other neighbors and in maintenance protocols with still other neighbors.

The normal operation of the system presented herein employs synchronization by the participating nodes. A stable time reference is incorporated in each node with means to set this standard to a master reference such as radio station WWV of the National Bureau of Standards or a global positioning system (GPS) satellite or it may be provided via a downline technique from a master time station within the total system.

It is therefore an object of the present invention to provide an improved communication system using a multiplicity of nodes operating on a defined neighbor basis for transmitting information packets between neighbors to the eventual destination using adaptive frequency selection between nodes where all of the frequencies being used may potentially be different, and in accordance with conditions at that moment in time for optimum reception.

Other objects and advantages of the present invention will be apparent from a reading of the specification and appended claims in conjunction with the drawings wherein:

Figure 2:
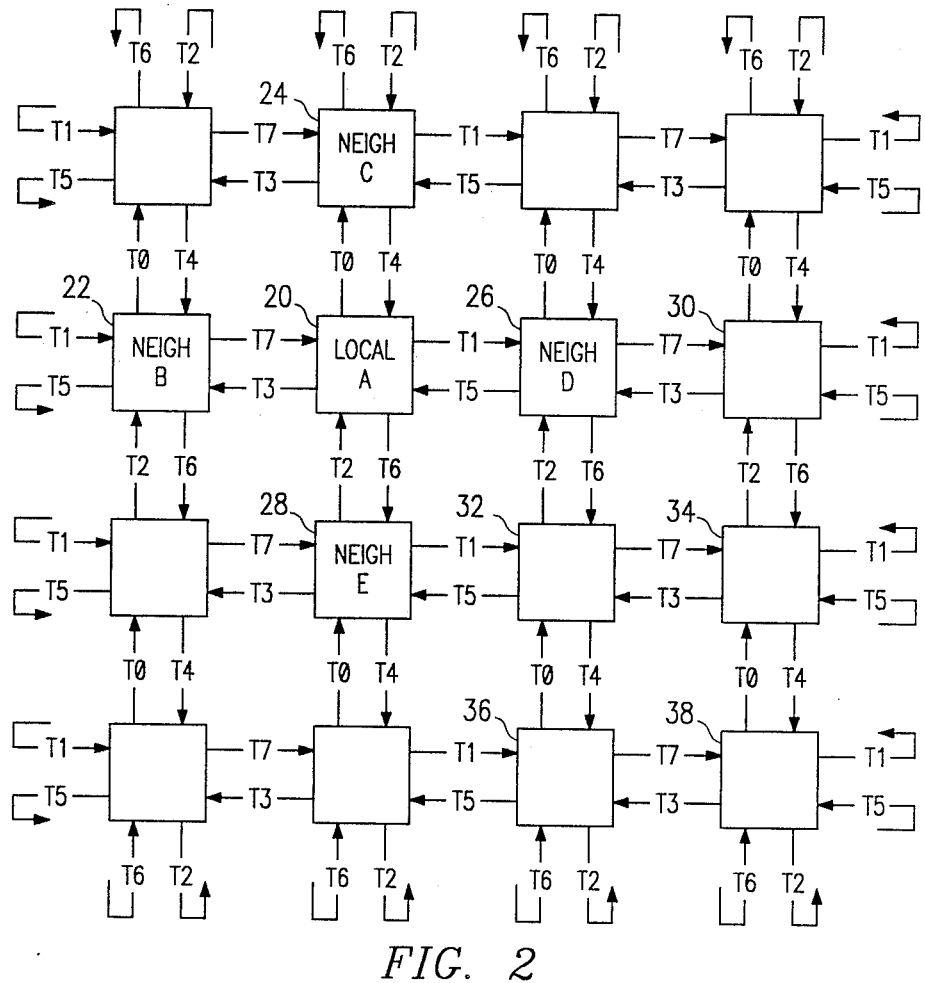
FIG. 2 illustrates a plurality of nodes and their interconnections to neighbors in the system.
Figure 4:
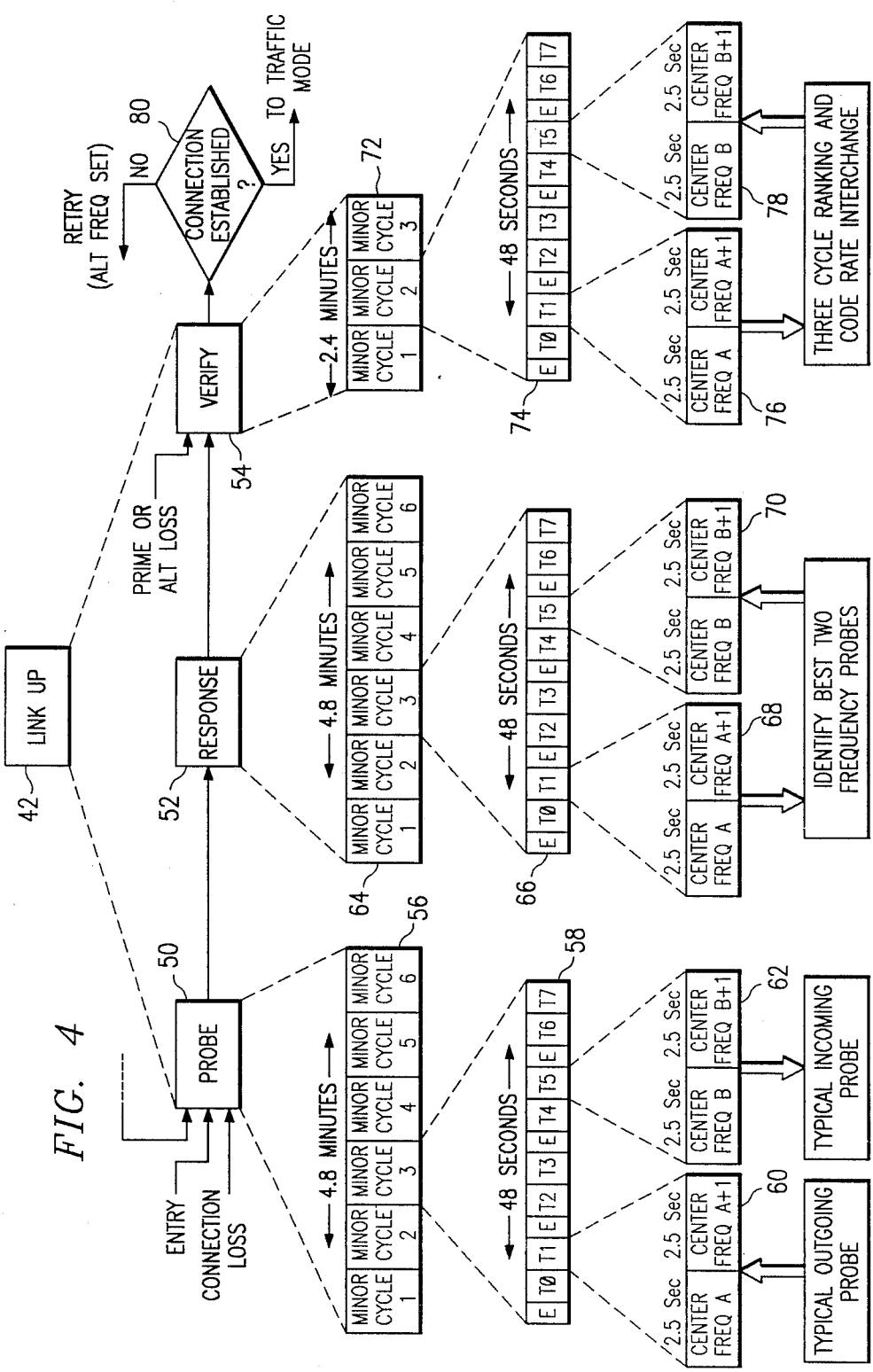
Figure 5:
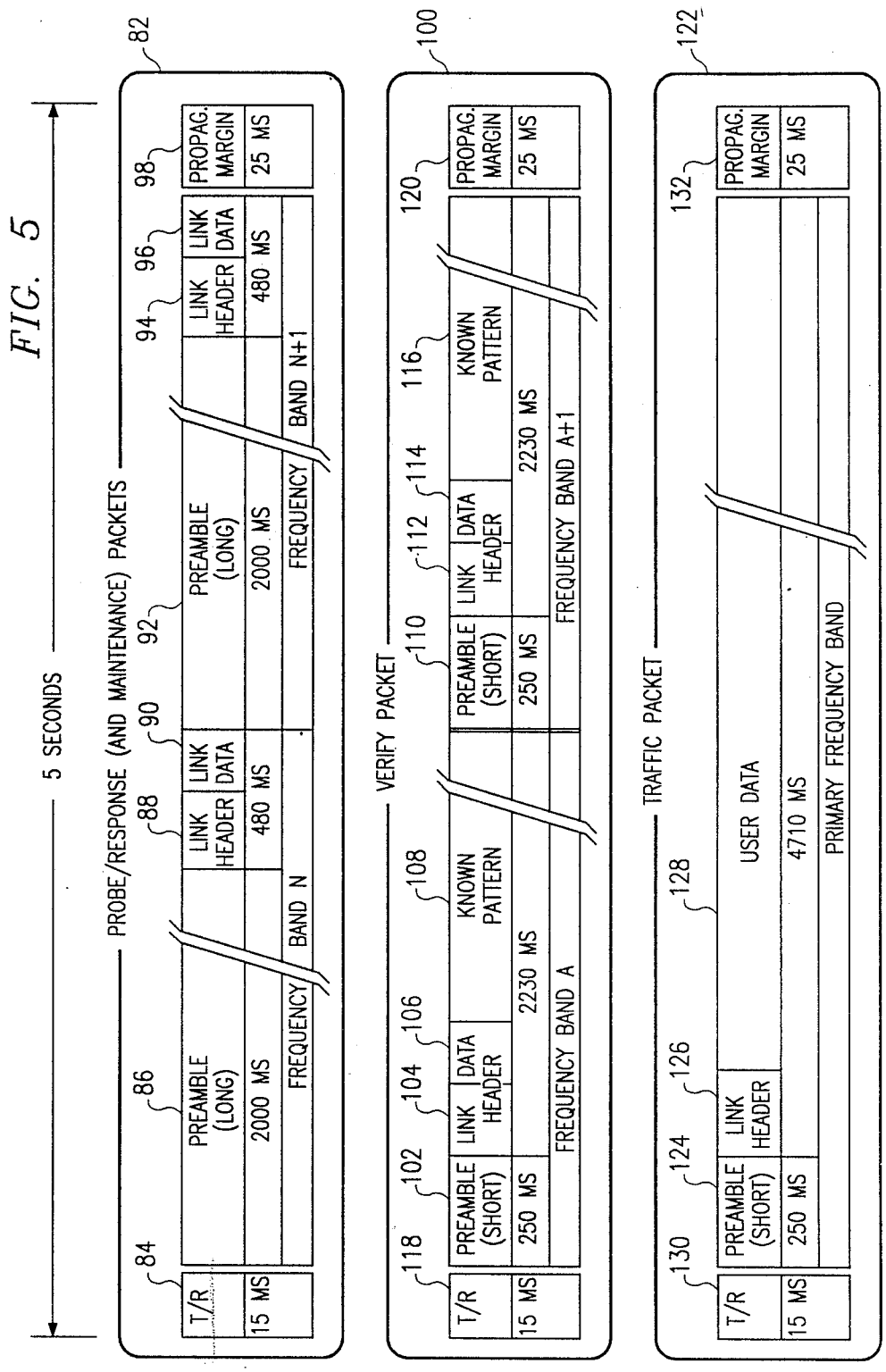
Figure 6:
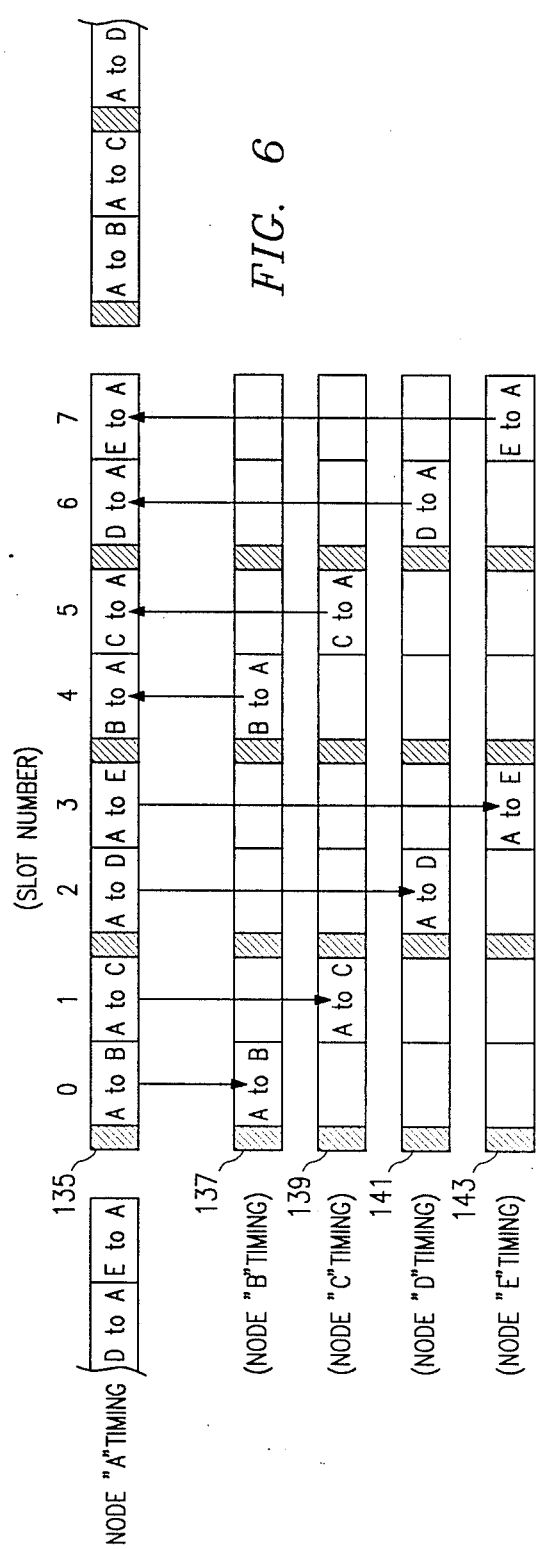
Figure 7:
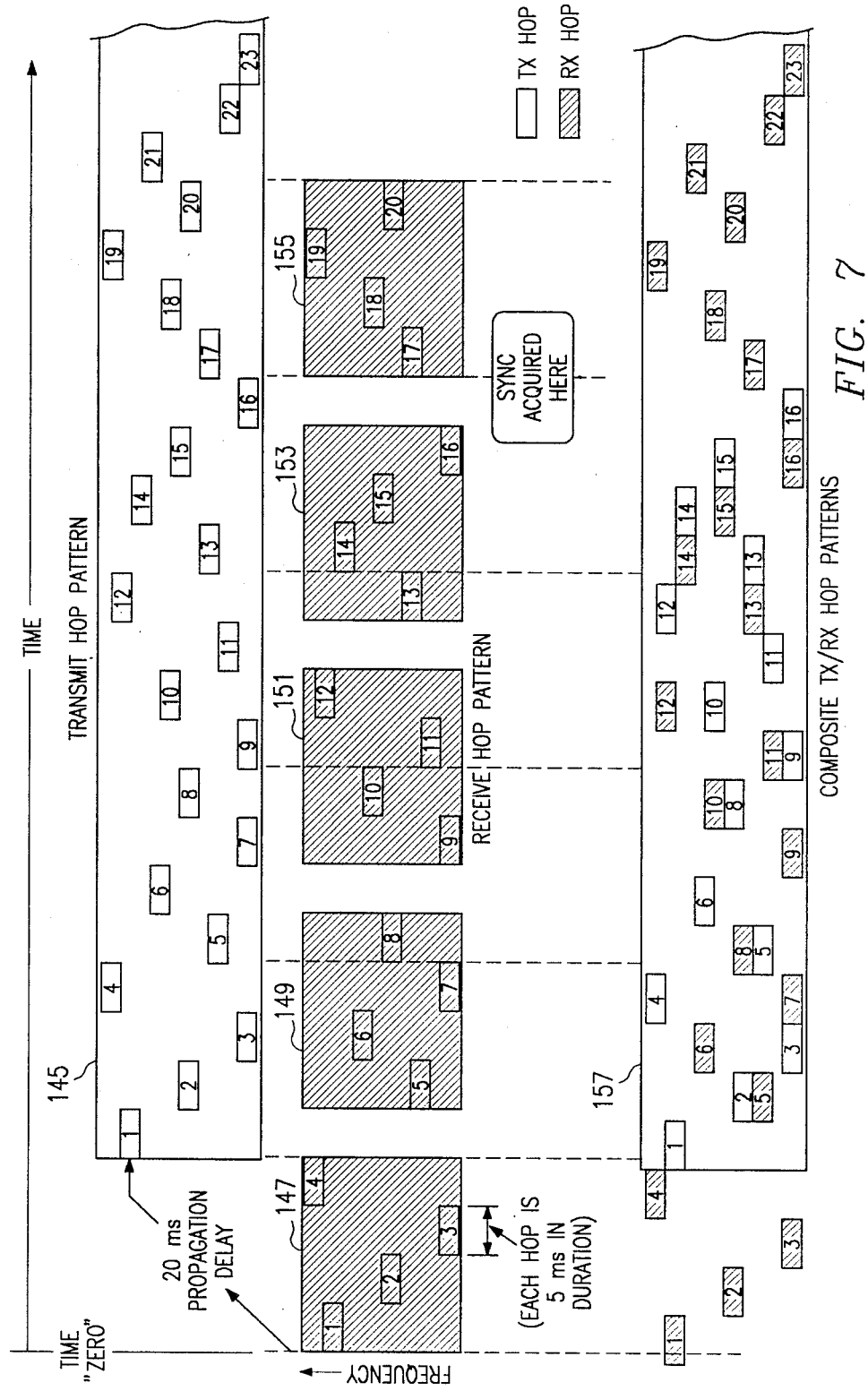
Figure 8:
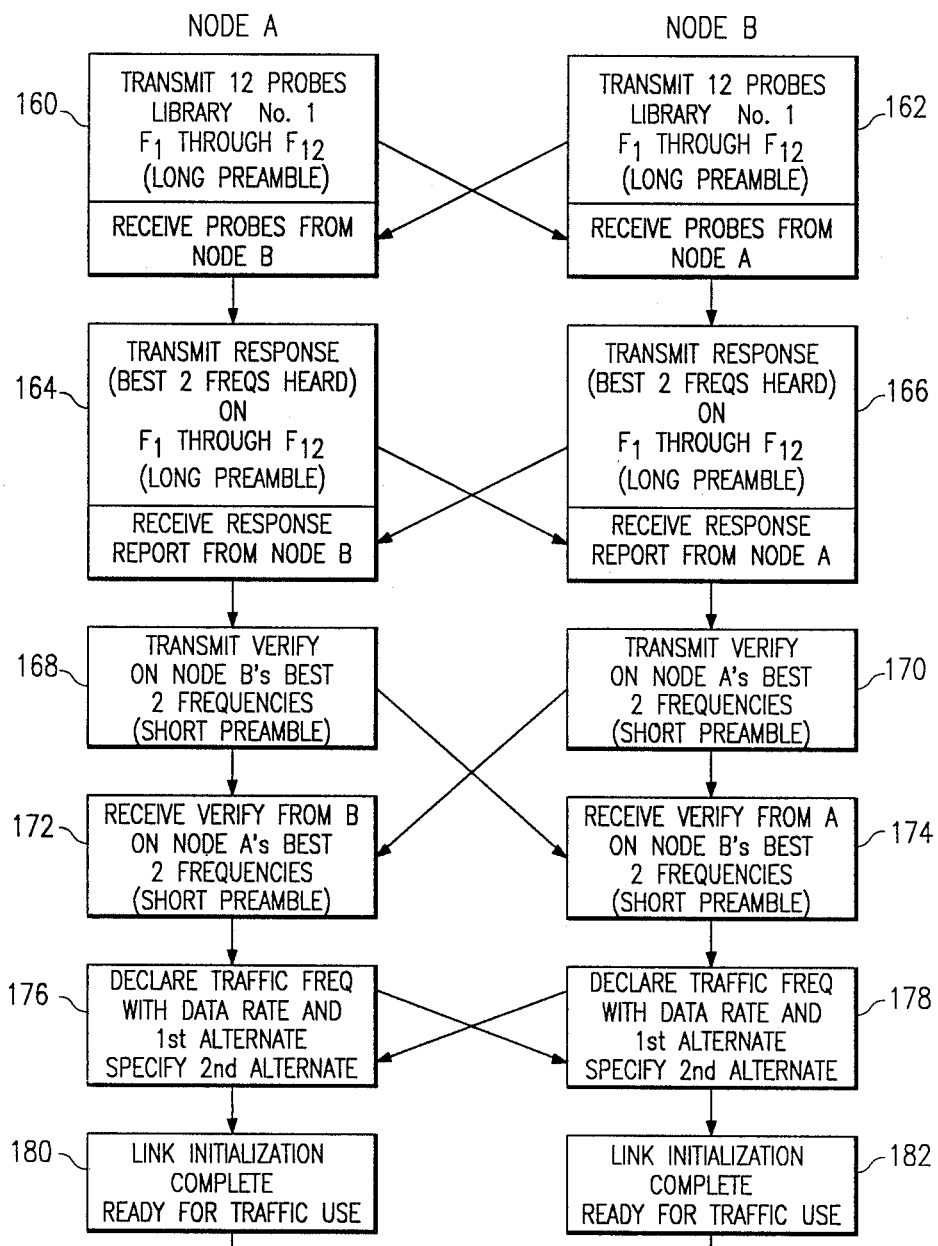
Figure 9:
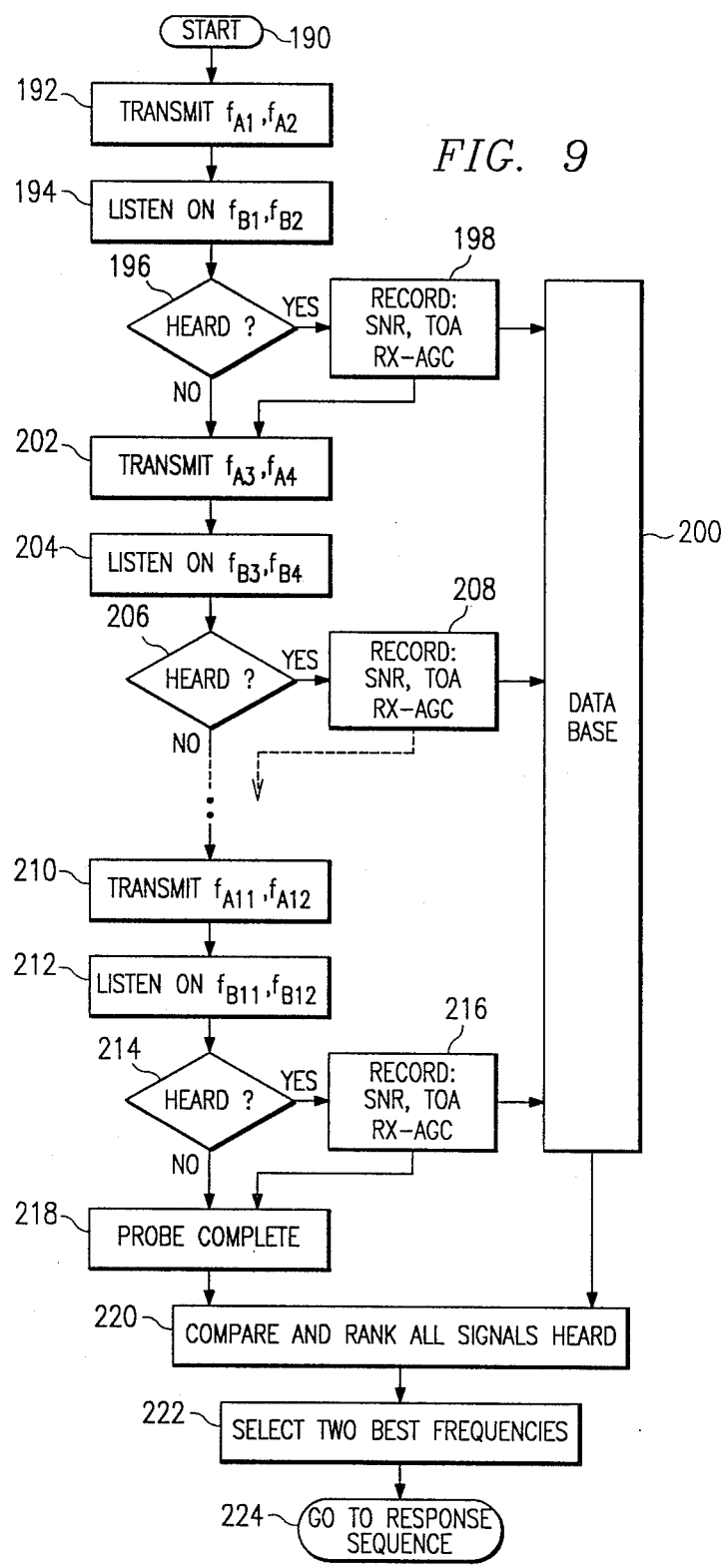
Figure 10:
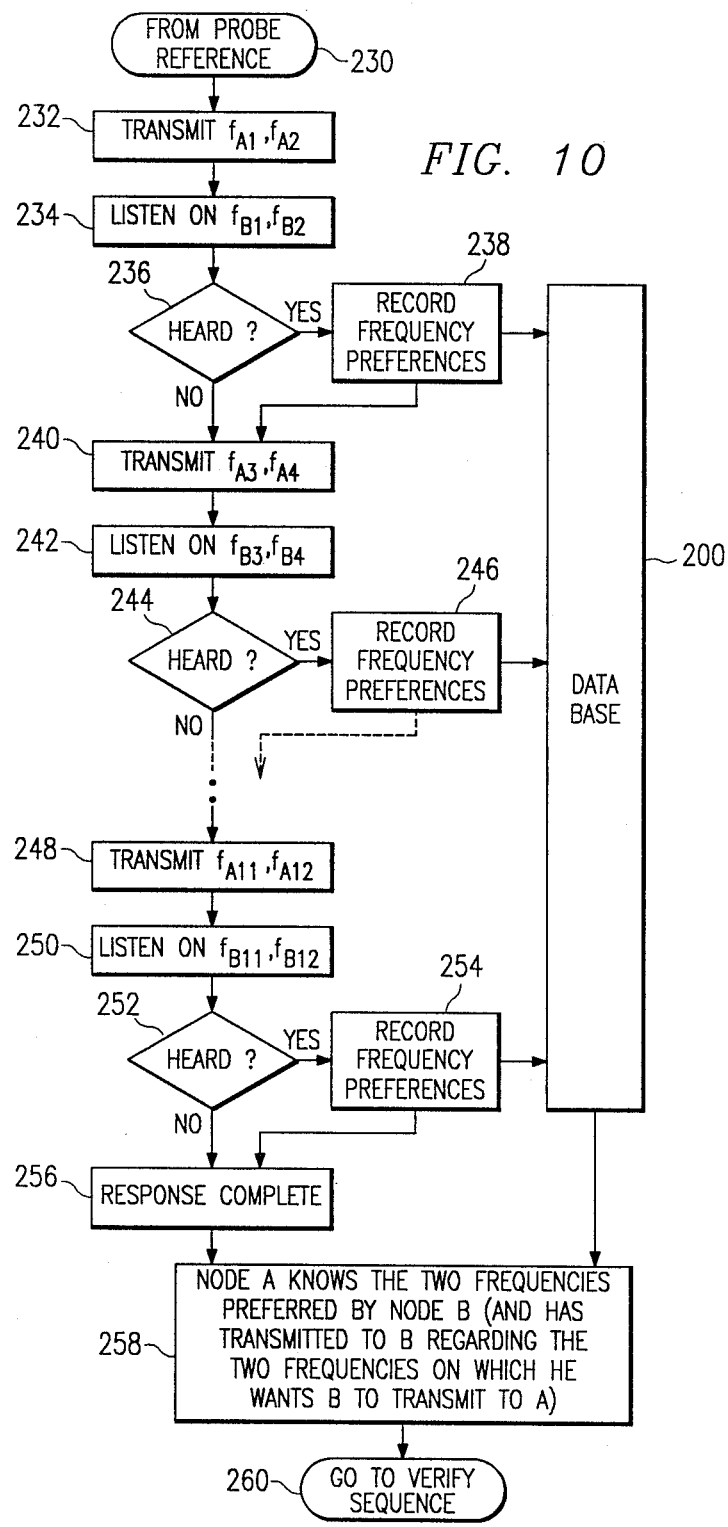
Figure 11:
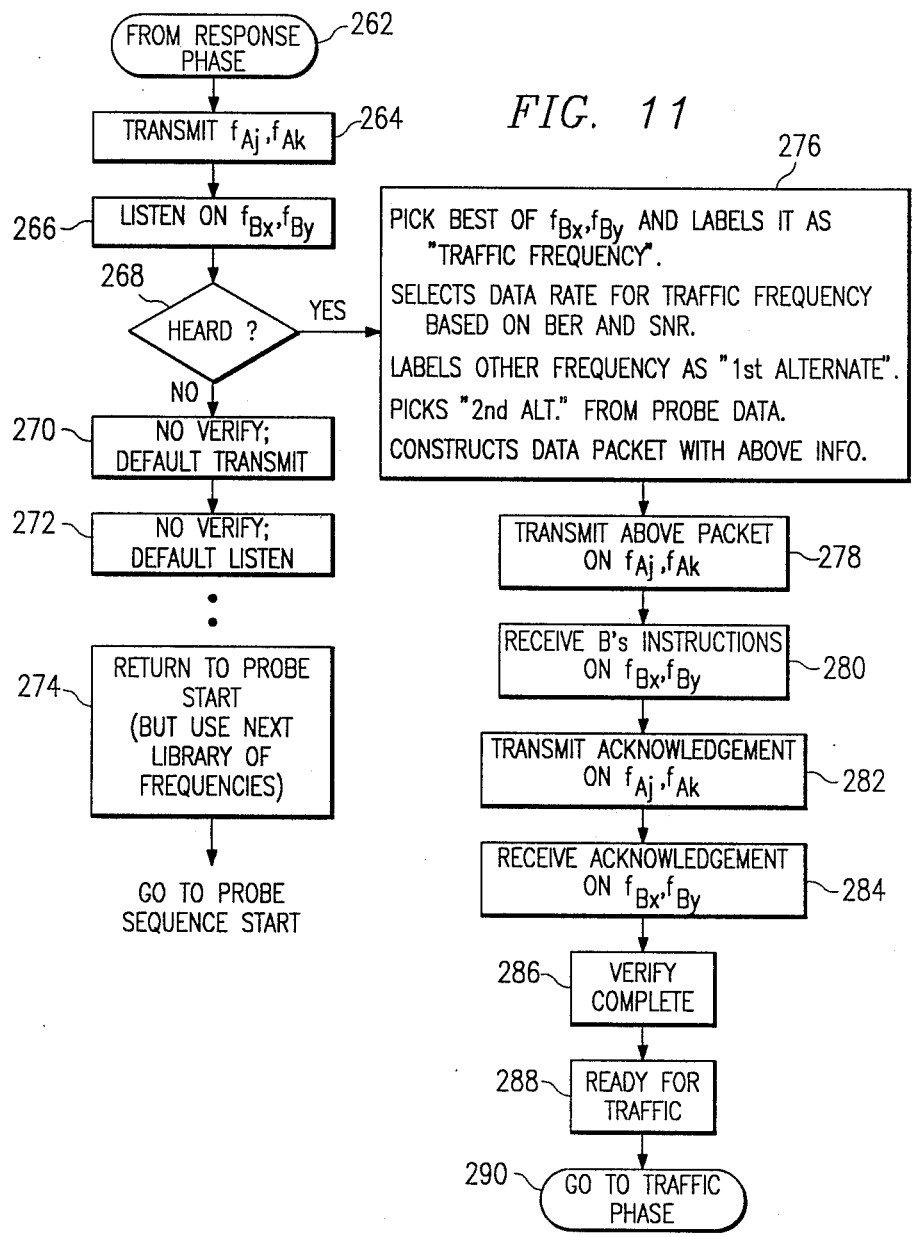
Figure 12:
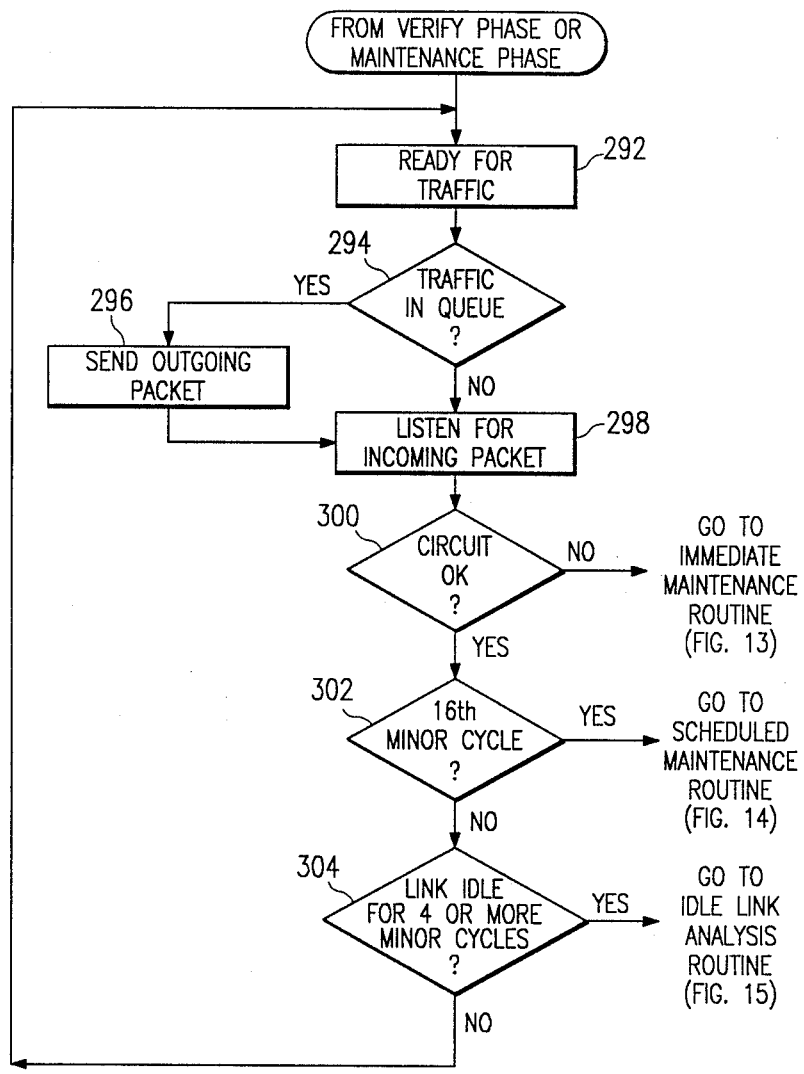
Figure 13:
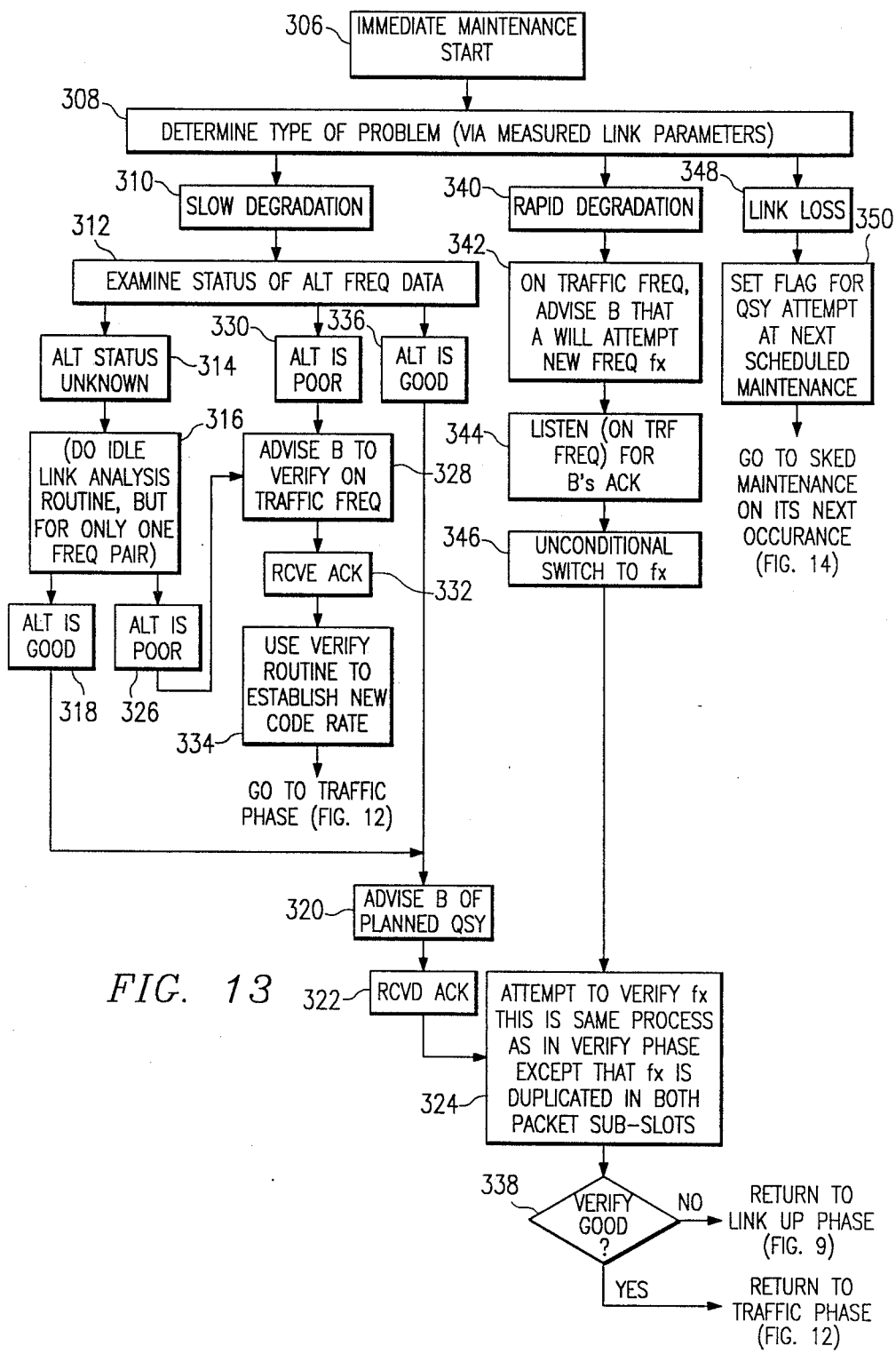
Figure 14:
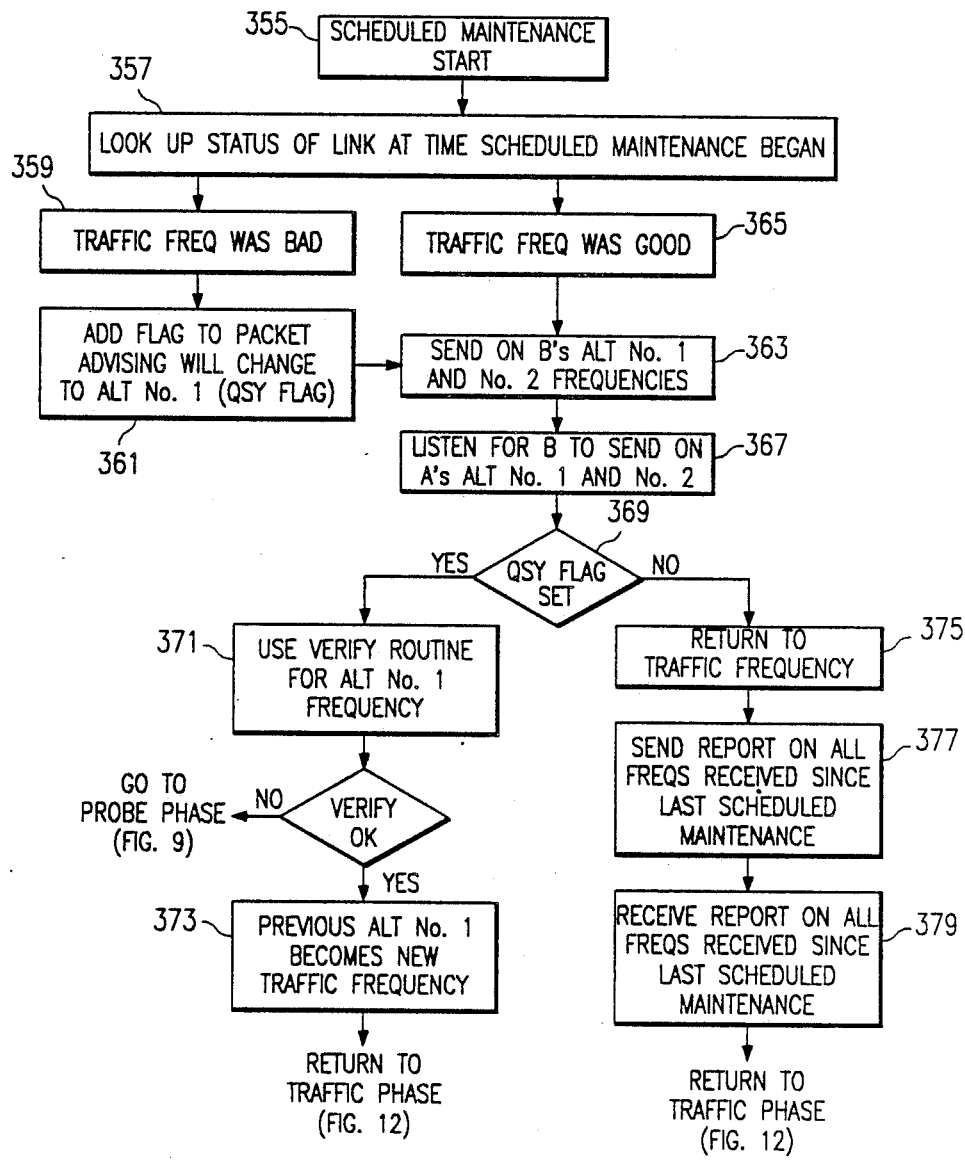
Figure 15:
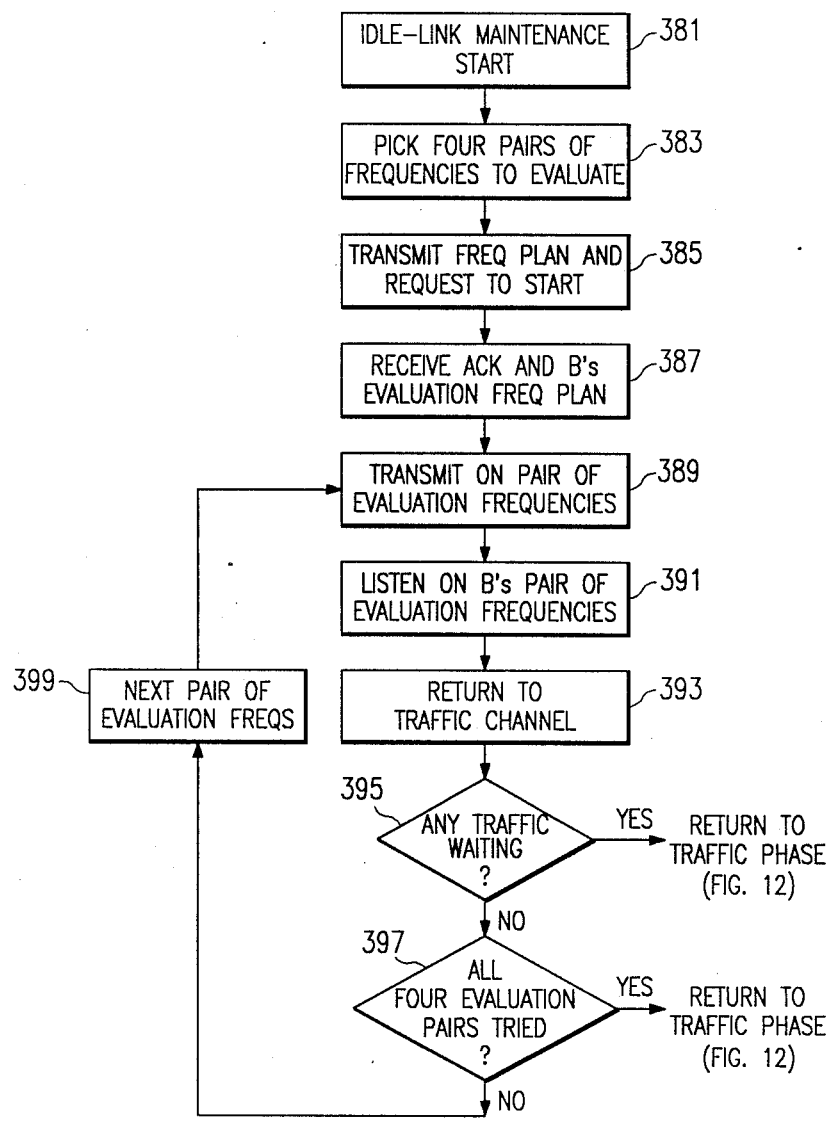

FIG. 4 provides further information on the link-up portion of the flow diagram with a breakdown as to the activities and the relative times for one embodiment of the inventive concept;

FIG. 5 illustrates the breakdown of the five second information packets for different modes of operation such as probe, maintenance, verify and traffic;

FIG. 6 is a diagram presenting the timing of information exchange between a given node A and each of its neighbors B through E as exemplified in FIG. 2;

FIG. 7 is a timing diagram used to illustrate synchronization between a transmitter and receiver where frequency hopping is used as a part of the transmitting operation;

FIG. 8 is an overview flow diagram of the link-up initialization process;

FIG. 9 is a flow diagram of the probe sequence portion of the link-up process;

FIG. 10 is a flow diagram of the response sequence of the link-up process;

FIG. 11 is a flow diagram of the verify portion of the link-up process;

FIG. 12 is a flow diagram of the traffic handling phase of the system;

FIG. 13 is a flow diagram of the processes involved when an immediate maintenance routine is required due to rapidly deteriorating communications on a given frequency band;

FIG. 14 is a flow diagram of the normal scheduled maintenance routine portion of the communication algorithm; and FIG. 15 is a flow diagram of the idle routine used when there is no traffic to transmit for greater than a predetermined length of time.

DETAILED DESCRIPTION

Figure 1:
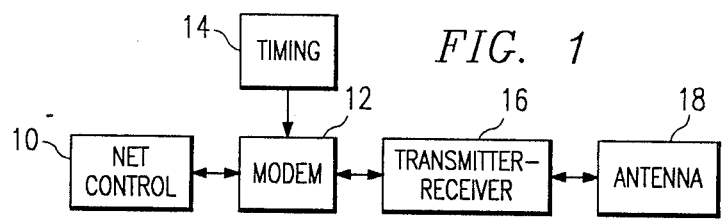
FIG. 1 is a block diagram of the components of a single node in the system.

As illustrated in FIG. 1, each of the nodes in the system comprises a net control block 10 supplying signals (data) to a modem 12 which also receives timing input signals from a timing block 14. The modem supplies signals to a transmitter receiver 16 which supplies outputs to antenna 18. As will be realized, the signal paths between 10, 12, 16, and 18 are bi-directional since when receive signals are supplied to the node, signals are transmitted from the antenna 18 to the receiver 16 and to the modem 12 which needs to communicate with net control 10.

In FIG. 2, a plurality of nodes are shown with a typical local node A being given designation 20 and it is in direct communication with nodes B, C, D and E which are given designations 22, 24, 26 and 28, respectively. For purposes of later discussion, other nodes are given designators as illustrated from 30 to 38.

Figure 3:
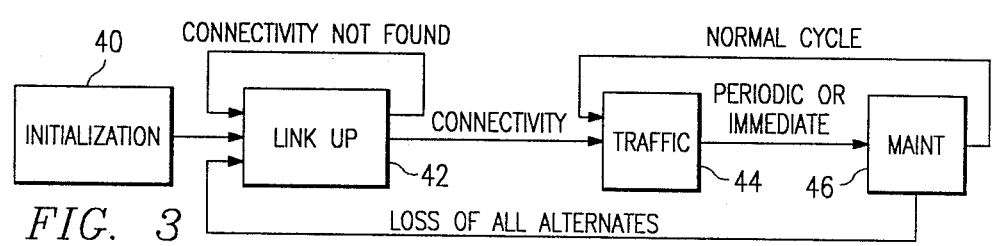
FIG. 3 is a block flow diagram of the operational states of a node relative each of its connectable neighbors.

In FIG. 3, a typical breakdown is illustrated of the overall algorithm used by the software in the node. The system goes through an initialization phase as shown by block 40, and then proceeds to a link-up phase 42. If connectivity is not found, the link-up phase is repeated until connectivity is found. Once connectivity is found, the device proceeds to a traffic phase 44 and then on a periodic or immediate basis, the node changes to a maintenance phase illustrated by block 46. After the maintenance phase, the system may return to the traffic phase 44 if the reason for maintenance was normal or the immediate problem was solved. If the node cannot return to normal traffic because there are no alternate frequencies remaining in memory that provide satisfactory connection or communication, the node returns to the link-up phase 42.

FIG. 4 illustrates that a presently preferred embodiment of the invention comprises the link-up phase 42 of FIG. 3 has three distinct portions comprising a probe cycle 50, a response cycle 52, and a verify cycle 54. A block 56 illustrates that the probe cycle lasts 4.8 minutes and comprises six minor cycles, each of which lasts 48 seconds such as designated in block 58 and that each of the minor cycles is comprised of four E slots (to be later assigned) and timing slots from T0 to T7. For connection between two nodes A and B, a block 60 provides more detail as to time slot T1 as a typical outgoing probe and a block 62 provides more detail as to an incoming probe in time slot T5.

The response portion of the link-up phase is shown in more detail in a 4.8 minute block of time 64 which comprises six minor cycles each of which is 48 seconds as illustrated in more detail in block 66 and the two time portions T1 and T5 are detailed in blocks 68 and 70, respectively, where the node is transmitting two frequency bands centered at A and A+1 as illustrated by block 68 and is attempting to receive at frequency bands centered at B and B+1 in block 70.

The verify portion of the link-up phase is provided more detail by a block 72 lasting 2.4 minutes and broken down into three minor cycles each of which is 48 seconds as detailed by block 74. The T1 and T5 time periods are illustrated in more detail in blocks 76 and 78 which provide for three cycle ranking and code rate interchange information in the transmit and receive operations of the verify portion of the link-up phase. Once verify has been completed, a decision is made by decision block 80 as to whether or not connection has been established and if yes the node proceeds to the traffic mode for communications with a given node and if connection has not been established with a given node, then there will be retry with an alternate frequency set.

In FIG. 5, packets of either the probe/response phases or the maintenance phases are illustrated by a block 82 which comprise a transmit receive margin of 15 milliseconds as represented by designator 84, a preamble section 86, a link header 88, a link data section 90, all for frequency band N. Then there is a further preamble 92, a link header 94, link data 96 and a receive margin 98 comprising a time period of 25 milliseconds. As will be noted, the preambles 86 and 92 for the probe phase and the maintenance phase are very long and in one embodiment of the invention lasted 2,000 milliseconds while the data time is comparatively short and comprises primarily information relating to the data characteristics. This data occurs at very low frequency rates for maximum connection potential.

By the time a verify packet is transmitted during the five second packet designated as block 100, the preamble can be shortened to 250 milliseconds since information is presumably already available as to the typical delay to be expected in the reception. The preamble block is designated as 102 with a link header 104, a data section 106 and a known pattern block of 108 for frequency band A. The known pattern allows channel error rate to be measured and code rate to be selected. A further similar time period labeled preamble 110, link header 112, data 114 and known pattern 116 is utilized for frequency band A+1. Again, an initial transmit receive margin time period comprising 15 milliseconds is labeled 118 and a receive margin time 120 is designated as part of the five second verify packet 100.

The traffic packet generally designated as 122 comprises a 250 millisecond preamble 124, a link header 126, and a data packet 128 wherein the preamble is similar to that of the verify packet 100 but the data packet comprises the remaining available space and is indicated as lasting about 4,700 milliseconds. The number of data bits transmitted depends upon the coding rate. The data rate utilized is less than the bit rate and varies in accordance with detected BER's from a maximum to ¼ the maximum in one embodiment of the invention. The total of the five seconds for the traffic packet includes a transmit receive margin block designated as 130 and a receive margin 132.

The 15 millisecond T/R at the beginning of each of the packets of FIG. 5 is a settling time to allow the transmitter to settle down after switching between transmit and receive modes between packets of information. The 25 milliseconds receive margin is an allowance for propagation time between nodes.

In FIG. 6, the timing of a given channel A is cross-correlated to each of its neighbors B through E. The block 135 shows the time slots from 0 through 7 corresponding to any of the 48 second time slots of FIG. 4. Block 137 shows the timing for neighbor B which receives information from node A in time slot 0 and transmits information to node A in time slot 4. Similar presentations are shown in blocks 139, 141 and 143 for nodes C, D and E as illustrated.

In FIG. 7, the beginning of a preamble of a packet such as preamble 86 is shown by block 145. Block 145 illustrates a simple example where the frequency hops between six distinct frequencies in a frequency band and represents the signal received from a remote transmitter. The next section shows various shaded blocks 147, 149, 151, 153 and 155. The present system is designed to allow for a maximum of 25 milliseconds of propagation delay and FIG. 7 illustrates a near maximum existing delay of 20 milliseconds. It will be observed that the sequence of frequencies used by the receiver in blocks 147 through 155 follows exactly the same pattern as those transmitted by the transmitter since this information is known and is a function of the time of transmit, the designation of the receiver, etc. The unknown is exactly how much propagation delay there may be. The receiver thus tries at the first possible instant that a transmit signal can be received to synchronize with any incoming signal. It then waits a short period of time such as the five milliseconds shown and then tries to again synchronize as shown by block 149. It then waits again and tries a further delay as shown by 151 and synchronization is found by the time of block 155. Block 157 shows the composite transmit and receive hop patterns. It should also be noted that although the hop frequency 9 of block 151 coincides with the hop frequency 7 of block 145, there is no correlation in the following hops. In actual practice, correlation needs to occur over a time period of many successive five millisecond intervals before the receiver is convinced that synchronization has been acquired. Thus, block 155 is merely a starting point at which the receiver begins counting time periods of correctly synchronized receiver anticipations and actually received frequency hop signals toward a time of realization by the receiver that synchronization has been achieved.

FIG. 8 provides an overview of the link-up process as illustrated briefly in FIG. 4. In FIG. 8, block 160 represents the probe process wherein twelve probes are transmitted to node B and there is an attempt to receive twelve probes from node B. The block 162 represents the similar operation in node B. Once the probe action has been completed, the nodes both proceed to the response portion of the program represented by block 164 for node A and 166 for node B. Each of the nodes transmit the two best frequencies heard on each of the potentially received frequencies F1 through F12 and attempt to receive the response from the opposite node on each of these frequencies F1 through F12. After the response portion is completed, each of the nodes proceeds to the verify step shown as 168 for node A and 170 for node B where each of the nodes transmits on the two frequencies indicated as being the best by the neighboring node. Each of the nodes goes to the receive verify step illustrated as blocks 172 and 174 to verify that those frequencies actually work and since the time delay and other characteristic have already been received in steps 164 and 166, a short preamble is adequate to achieve synchronization prior to the data and known pattern as illustrated by block 100 in FIG. 5. Each of the nodes goes to the next general step shown as blocks 176 and 178 where the traffic frequency is declared along with a data rate and the first alternate as obtained from the two received frequencies and a second alternate is specified where appropriate from the information received during the blocks 164 and 166. The nodes then proceed to blocks 180 and 182, respectively, and the unit is ready for traffic use. As will be realized, if no signals are received, the link-up process must be repeated as shown in FIG. 3 but all of the steps of FIG. 8, except for the last step, are still processed before recommencing.

In FIG. 9 more detail is provided as to the probe sequence such as outlined by block 160 of FIG. 8. The start block 190 merely represents whatever initializations are required either on initial entry or upon ascertaining a lack of connectivity and re-trying the link-up process. From there the system goes to a transmit mode in block 192 where it transmits two frequencies (actually frequency bands due to the frequency hopping process) such as would occur in the first minor cycle illustrated in FIG. 4 and then would listen on two frequencies in block 194. These two frequencies may be the same as that for the transmit frequencies of 192 but may also be and typically would be different frequencies. Relating FIG. 9 to FIG. 4, the transmit block 192 would be on time period T1 while the listen would be time period T5. A decision is made in decision block 196 as to whether or not any information was received on either frequencies B1 or B2 and if information has been received, the signal-to-noise ratio (SNR), the time of arrival (TOA), and the automatic gain control (AGC) level utilized in receive is detected in block 198 and this information is passed to a database generally indicated as 200. After this information is recorded, the system proceeds to block 202 to transmit two more frequencies. Even if nothing was heard as to the two frequencies B1 and B2 in block 194, the HEARD? decision proceeds to transmit block 202. This transmit block would correspond to minor cycle 2 of FIG. 4. The system then proceeds to listen on two further frequencies as indicated in block 204. If either one of the two frequencies detects valid information, a decision is made in block 206 to record this information via block 208 in the database 200. The system then returns to the next transmit/listen cycle through minor cycle 6 where the transmit block 210 and the listen block 212 refers to frequencies 11 and 12. After the decision block 214 and a record block 216 complete their tasks, a probe complete step 218 is entered which indicates to block 220 to compare and rank all signals heard so that in block 222 the two best frequencies can be selected. It should be noted that if several frequencies are heard by the HEARD? decision blocks, the system will pick the two with the highest signal-to-noise ratio. If several frequencies have the same best signal-to-noise ratio, the two frequencies which are picked are at the center of the group under consideration. If only one frequency is heard, it is selected as well as the next lower frequency in the library of frequencies for that link-up process. If no frequencies are heard, two frequencies are selected through some internal process which, in the present embodiment, are the two highest frequencies. This final selection is made even though, as was indicated, no signals were heard since atmospheric conditions change enough that there is still some possibility that the system in the response or verify portions of the link-up process will successfully complete the link-up process over the twelve minute cycle required to accomplish same. From block 222, the program goes via step 224 to the input of the response sequence of FIG. 10.

In FIG. 10, the process starts with the go-ahead signal from the probe sequence as shown by block 230 and then commences with blocks 232 and 234 where the unit transmits on frequencies A1 and A2 the information correlated from the probe process and then listens for similar information from node B at the first two frequencies expected to be heard. If any information is heard, the decision block 236 uses block 238 to record the frequency preferences as well as the frequencies upon which this information was received in the database 200 which is the same as was used in FIG. 9. In either event, the program proceeds to the step of block 240 where it transmits the same information as transmitted in step 232 on two further frequencies and listens in two further frequencies as a part of block 242. The transmit, listen and HEARD? decision along with recording continues through six minor cycles as outlined in FIG. 4 for each signal pair until in minor cycle 6 the final set of decisions are made and recorded via the steps of block 254 and a response complete indication is provided via block 256. In accordance with block 258 the node now knows the two frequencies preferred by neighbor node B and has transmitted to B information regarding the two frequencies upon which node A wishes B to transmit to A. At this time, the unit goes to the verify sequence of FIG. 11 via block 260.

In FIG. 11, signals are received from the verify phase of FIG. 10 via block 262, and the program proceeds to the transmission of verify packets such as 100 shown in FIG. 5 and during three minor cycles 72 as shown in FIG. 4. The transmission occurring in block 264 comprises the two frequencies selected from the recordings in connection with the response phase and as determined by the information contained in database 200. The program then proceeds to the block 266 where it listens on the frequencies previously sent to the neighboring block as its main and alternate frequencies. If no information is heard on either of the two frequencies in the decision block 268, the system goes through the motions of transmitting and listening for the additional two prescribed minor cycles whether or not it receives any information on minor cycles 2 and 3. This is shown by blocks 270 and 272 the dotted lines between block 272 and a block 274 indicating a return to probe start but using a next library of frequencies. If, on the other hand, the signals are received in block 266 as determined by decision block 268, the program proceeds to block 276 where it picks the best of the two signals received and labels it as the traffic frequency of choice. Based on the bit error rate (BER) and the signal-to-noise ratio, it also picks a data rate to be used in conjunction with that traffic frequency and labels the other frequency as a first alternate. From the further information stored in the database 200, the system picks a second alternate even though this frequency has not been verified in the verify sequence. A data packet is constructed containing the information compiled above and the information is transmitted during minor cycle 2 in accordance with block 278 and the neighbors instructions are received during that same minor cycle in accordance with block 280. An acknowledgement is transmitted in accordance with block 282 in minor cycle 3 of the verify phase and acknowledgement is received from the neighbor in block 284 that the neighbor received the instructions sent to it. Blocks 286 and 288 represent the determination that verify phase or sequence is complete and that the system is ready for traffic and from there it goes to the traffic phase of FIG. 12 via block 290.

It needs to be remembered that the system is true time multiplex and a given node can be in a link-up phase with one neighbor node, in a traffic phase with another neighbor node, and be in immediate maintenance phase with respect to a third neighbor node. This capability is made possible by the system design of all of the information packets whether probe, maintenance, verify or traffic having a total period of five seconds as set forth in FIG. 5 thereby fitting in a given communication time slot as set forth in FIGS. 4 and 6.

FIG. 12 provides a flow diagram for the traffic handling phase of operation wherein the system receives an indication from the verify phase that it is ready for traffic as set forth in block 292, the decision block 294 ascertains whether or not there is traffic in queue and, if there is, an outgoing packet is transmitted in accordance with block 296 and the node then listens for an incoming packet in accordance with block 298. If there was no traffic in queue, the system would go directly to block 298 and listen for the incoming packet. Decision block 300 checks to see whether or not the circuit is okay and if it is not, it goes to the immediate maintenance routine of FIG. 13. If the circuit is okay, the decision block 302 checks to see if this is the sixteenth consecutive minor cycle or a multiple thereof since commencing the traffic phase and if it is, the system goes to the scheduled maintenance routine of FIG. 14. If it is not the sixteenth minor cycle or a multiple thereof, the system goes to decision block 304 to check to see whether or not the link has been idle for four or more cycles. If it has been idle for four or more minor cycles, the system goes to the idle link analysis routine of FIG. 15, otherwise it returns to block 292 to continue in the traffic phase.

In FIG. 13, an indication to start immediate maintenance, as obtained from decision block 300 of FIG. 12, actuates the procedures within block 306 to determine the type of problem in accordance with measured link parameters as ascertained in block 308. If the type of problem is slow degradation, the block 310 causes an examination of the alternate frequency data in block 312 and if the alternate status is unknown, block 314 causes a link analysis routine in accordance with block 316 except that the analysis is only done for one frequency pair. If the link analysis routine indicates that the alternate is good, block 318 causes the system to advise the neighbor node B via block 320 of a planned change in frequency. Those skilled in the art will realize that QSY is a standard code used throughout the communications world of an indication of plan to change in frequency. Block 322 proceeds with receiving an acknowledgement from neighbor B that the change frequency information was received and the system proceeds to block 324. If the link analysis routine of block 316 determines that the alternate is of poor quality, in accordance with block 326, a transmission is made in accordance with block 328 to verify on the traffic frequency. This step 328 also occurs if the initial examination determines that the alternate is "poor" in accordance with block 330. The system receives an acknowledgement in accordance with block 332 and proceeds to block 334 to use the verify routine to establish a new code rate and then go to the traffic phase of FIG. 12. The receive acknowledgement block 332 uses the following rules in proceeding to block 334. (A) If the acknowledgement is received on the first attempt, two attempts to verify are allowed and if either verify is successful, the link proceeds to the traffic phase as shown. (B) If an acknowledgement is not received on the first try, an additional try for acknowledgement is allowed and in this case a single verify attempt is allowed. (C) If a verify is not accomplished on either of the previous rules, the link goes back to the link-up phase in a new attempt to establish communications. If, in accordance with the examination of block 312, it is determined that the alternate is in good shape, the block 336 causes the node to proceed to the step indicated in 320 whereby an attempt is made to either return to the link-up phase or return to the traffic phase in accordance with decision block 338. If the determination of block 308 indicates that the deterioration or degradation of the signal is rapid, the system proceeds from block 340 to block 342 where a signal is transmitted to B on the traffic frequency that node A will attempt a new frequency designated fx. The system will listen on the traffic frequency for B's acknowledgement in accordance with block 344 and will provide an unconditional switch to frequency fx as indicated in block 346. The software proceeds to step 324 and in accordance with verify block 338 returns to the link-up phase of FIG. 9 or the traffic phase of FIG. 12. If, on the other hand, the determination block 308 ascertains that there is link loss as shown by block 348, a flag is set in accordance with block 350 for a change frequency attempt at the next scheduled maintenance and the program goes to scheduled maintenance of FIG. 14 at its next normal occurrence. Since the link-up process starts at predeterminable times, it does not instantaneously return to the link-up phase but rather proceeds in accordance with established schedules.

FIG. 14 comprises the scheduled maintenance procedure as indicated by block 355 which checks the status of the link at the time scheduled maintenance begins as illustrated by block 357. If the traffic frequency was bad at that moment, block 359 causes the system to proceed to block 361 to add a flag to the maintenance packet in the data section advising the neighbor node that the present node will change to alternate 1. The system then proceeds to block 363. If the block 357 determined that the traffic frequency was good, the program proceeds through block 365 to block 363 and sends data on B's alternate Number 1 and Number 2 frequencies and then proceeds in block 367 to listen for similar type information from neighbor B. If the node notes in decision block 369 that the "change frequency" or QSY flag is set, the program proceeds to block 371 where a verify routine is utilized to establish alternate Number 1 as the traffic frequency and if this is successful, block 373 establishes alternate Number 1 as the new traffic frequency and the program returns to the traffic phase of FIG. 12. If this is not successful, the program returns to the probe phase of FIG. 9 to re-establish a link. On the other hand, if the QSY flag is not set in accordance with decision block 369, the program returns the system to the traffic frequency via block 375 and sends a report to the neighbor node in accordance with block 377 of all frequencies received since the last scheduled maintenance and the measured parameters. This information is not only for the traffic frequency and alternates, but for any other frequencies that may have been sounded during "idle maintenance". Block 379 is indicative of receiving similar information from the neighbor node and the system then returns to the traffic phase of FIG. 12.

As illustrated in FIG. 15, block 381 commences the idle link maintenance start of the analysis routine and causes the system to proceed to block 383 where four pairs of frequencies are selected to evaluate. In block 383, the system picks each pair (comprising the nearest frequency band on either side of the traffic frequency) while excluding already selected alternates and working outward according to any set of algorithm defined increments. If there are unequal numbers of frequencies available above and below the traffic frequency, the algorithm must be flexible enough to accommodate such situations. While the present embodiment happens to pick four pairs of frequencies to evaluate, there is no reason that the system could not pick more or less pairs of frequencies to evaluate for the inevitable deterioration of conditions on the present traffic frequency. After the pairs are selected, the system transmits the frequency plan and a request from the neighboring node to start the maintenance procedure in accordance with block 385. When the node receives an acknowledgement as set forth in block 387, it transmits the first pair of evaluation frequencies in accordance with block 389. The system then listens as set forth in block 391 on a pair of evaluation frequencies from the neighbor nodes such as B and then returns to the traffic channel in accordance with block 393. Decision block 395 ascertains whether or not there is any traffic waiting and if there is, the system returns to the traffic phase of FIG. 12 but if there is not any traffic, decision block 397 ascertains whether or not all four evaluation pairs picked in block 383 have been tried and if they have not, the system returns via block 399 to block 389 to transmit the next pair. On the other hand, if all four pairs have been tried, the system returns to the traffic phase of FIG. 12.

OPERATION

By definition, in this invention, "skywave" means that communication which is supported by ionized regions above the earth. Such communication is characteristic of high frequency (HF) but may also occur at even higher frequencies. This invention, while relating to skywave communications, describes apparatus which changes operational frequencies on an adaptive basis in accordance with conditions at the moment and may intermix skywave communications with surface wave communications as conditions alter and without any intervention from an operator.

The information provided thus far in the Background and Detailed Description tends to render the operation obvious to one skilled in the art. However, it is believed that a few comments relative the operation and special features are still appropriate.

The present invention is set up to work within a multinode system such as shown in FIG. 2. Any node can communicate with any other node in the system although it accomplishes this communication only through one of its directly connected neighbor nodes. In other words, if node 20 of FIG. 2 desires to communicate with node 38, node 20 sends the information to one of the neighbors B through E and the neighbor such as neighbor E or node 28 communicates to its neighbors such as neighbor 32. The packet is then eventually routed to node 38 via either node 34 or 36. While the algorithm or decision process for determining the eventual path for transmission between nodes does not form a part of the inventive concept, whatever algorithm is utilized would further utilize the information stored at each and every node in the system as to the linking capabilities of every node within the system. In other words, each node stores information as to the connectability of every other node in the system to each of its neighbor nodes. As an example, node 20 may have communication difficulties at the time that a communication is to be sent between itself and node 28 and is in a link-up process. If such a situation exists, node 20 would know that it would be more appropriate to transmit either to node 26 or 22 in an attempt to provide information to either node 30 or 32 for eventual distribution to node 38 and would not use the communication path between nodes 20 and 28. In very large systems, where it is neither convenient nor useful to store connectivity information on every remote node, the maintained connectivity information consists of those nodes in the immediate vicinity plus vectoring information to direct the message in the direction of the desired remote node.

As designed and illustrated, each node in the system operates on a time multiplexed basis with each of its neighbor nodes and each node is able to store sufficient information so that the status of that node and its operational frequencies with respect to one neighbor node are substantially independent relative any interactions with a different neighbor node. In other words, node A can be transmitting traffic to neighbor node B on one frequency and receiving traffic information from node B on a different frequency while at the same time trying to establish link-up procedures with node C, performing an idle link analysis of other potential frequencies with node D and performing a maintenance function with node E to determine the best solution to deteriorating communication conditions between node A and node E in an attempt to switch to a further frequency that might support traffic.

The time multiplexing aspects are illustrated in FIGS. 4 and 6. In FIG. 4, an example is provided during the link-up process or sequence where it is illustrated that communications between node A and neighbor node B might very well occur with transmissions to node B from node A occurring during a T1 or time slot 1 five second portion of each minor cycle while transmissions from node B to node A occur during time slot 5 of each minor cycle.

FIG. 6 is merely illustrative of the concept and does not coincide with the time multiplex assignments of FIG. 4. However, FIG. 6 does illustrate that for a given system, node A may transmit to node B in time slot 0 and receive from node B in time slot 4 with the remaining communications to and from other neighbors taking place as illustrated where the entire period for time slots 0 through 7, and including the shaded times reserved for future use comprise a 48 second minor cycle.

Prior art systems have tended to be passive as opposed to dynamic. By this we mean that the prior art systems have assumed that if station A can hear station B best on twelve megahertz, that station B will also receive station A best on twelve megahertz. This is not always valid. Further, passive systems have designed under the further assumption that a given data rate of traffic between two nodes in one direction will also provide satisfactory performance in the opposite direction. Again, such assumptions are not always valid. However, the amount of checking required to analyze various frequencies, bit error rates, and other parameters was not reasonably within the capabilities of most human operators.

In accordance therewith, each node of the present system not only monitors and reports as to the quality of signals received, but in addition, analyzes potential other frequencies for use when conditions interfere with signal quality at the presently used traffic frequencies, and also stores for monitoring purposes the parameters as analyzed by many or all of the other nodes in the system. This information is useful not only to the node for communications between its neighbors, but useful to any traffic routing algorithm for determining the best route to use in order to transmit traffic not only from a number of nodes standpoint, but also from a data rate transmission standpoint. In other words, a multinode transmission at a very high data rate might be more time effective than a lesser node transmission through a lesser number of nodes at a very low data rate.

Within a given frequency band, frequency hopping provides for data security and improves reliability of communications in the presence of environmental interference. (Frequency hopping will be explained herein briefly but the subject is covered in more detail in a U.S. Pat. No. 4,066,964, to Costanza, et al., assigned to the same assignee as the present invention.). The frequency hopping pattern is, however, a function of not only parameters such as time of day and date, but very importantly of an identification number of the node. If conditions for communications were such that all nodes were operating in the same frequency band for both transmitting and receiving, the specific frequencies used in the band at any given moment in time in the frequency hopping process would minimize interference problems since a node would be designed to synchronize only to a given frequency pattern expected from a given neighbor station and would reject frequency hop patterns in the same general band, but having a different "signature" from other nodes than its assigned neighbors. As will be realized, although six frequency hops are shown for simplicity and illustrative purposes in the disclosure, a more realistic number of frequency hops that would be likely to be used in an operational system comprising 32 nodes would be 132 different hop frequencies. Further, even though FIG. 7 illustrates that blocks of four hops are compared at a time, one embodiment of the inventiveconcept used 50 hops per block and the inserted delay between search blocks was smaller to insure more accuracy in connection with the synchronization process.

It should be noted that frequency hopping is not a condition to system operation and in fact, frequency hopping requires more overhead and longer preambles in the packets, but if frequency hopping were not used some other mode of identifying received transmissions would have to be used. Also, there is the possibility that, without frequency hopping, problems of interference would have to be dealt with as to communications from non-neighboring nodes whose signals have reached the antenna of a given node. The same comments apply to other features detailed in the specification and the claims.

For simplicity in describing the operation of the system, the following discussion will refer only to the activity occuring in the time slots common to two nodes, A and B, even though each of the nodes under discussion are also communicating on a time multiplexed basis with other neighbor nodes.

The net control block 10 of FIG. 1 provides the primary control of each node and contains the program summarized in the flow charts of FIGS. 8 through 15 to initiate communication connections with each of its assigned nodes, handle traffic originating from and terminating at the node as well as that being passed through the node to other nodes in the network, to dynamically adjust parameters of the node in accordance with constantly changing conditions and to analyze conditions on a continuing basis in preparation for being able to alter parameters at any time presently used traffic frequencies or data rates show signs of deterioration. While the net control block 10 is shown connected to the transmitter 16 only through modem 12, the control block 10 does control block 16 as to whether it is transmitting or receiving and the frequency that unit 16 is operating at for any given moment in time. The net control block 10 also uses timing information as received from block 14 to establish when certain actions will occur and to adjust the frequency hopping pattern as a function of time for data security.

As previously indicated, the link-up process starts at prescribed times relative to the hour and in accordance with FIGS. 3 and 4. A probe signal transmits two different frequency (band) signals in a five second time slot where in one embodiment of the invention there was a long two second preamble and a short one-half second data field. This probe comprises not only transmitting two frequencies during a minor cycle but listening on two frequencies (frequency bands) determinable as set forth in memory storage from an assigned neighbor node. This process is repeated six times for a total of twelve frequencies transmitted and twelve frequencies monitored for reception. At the conclusion of the probe portion of the link-up sequence, the node has recorded data as to signal-to-noise ratio, time of arrival, and automatic gain control settings among other items on any of the twelve frequencies detected as set forth in the flow diagrams of FIGS. 8 and 9. At this time, in accordance with FIG. 9, block 220, the system compares the various received signals, if any, and selects the two best frequencies and proceeds to the response cycle. During the response cycle, and as illustrated in FIGS. 8 and 10, the node again sends the information packets having a long preamble and short data section as shown in FIG. 5 on each of the twelve frequencies and again listens on twelve frequencies utilized by the neighbor node. The information in the data portion of the packet includes the information obtained in blocks 220 and 222 of FIG. 9 as to the ranking of the signals heard and the frequencies that were selected. As will be realized, due to the frequency sensitive nature of HF communications, it is likely that some, if not many, of the probes will not be received and those that are received will be of varying quality. By duplicating this data on each of the twelve frequencies, there is a reasonable likelihood that the neighbor node will receive the information transmitted on at least one of these frequencies. As shown in FIG. 4, and detailed in the flow diagrams of FIGS. 8 and 11, the system then proceeds to the verify cycle. At this point, the two nodes know the two frequencies preferred by the other node if communication was established on any of the twelve frequencies and that node uses the two selected frequencies to send the verify packet of FIG. 5. A much shorter preamble is used in the verify process of FIG. 11 since at least in theory the node now knows the automatic gain control settings to be used and the approximate time delay (time of arrival) and other pertinent information. The preamble used is of the type that would be used by traffic packets. If the information is heard in accordance with the decision block 268 of FIG. 11 on either or both of the frequencies, the node selects the desired traffic frequency and first alternate as set forth in block 276 and transmits that information to the neighbor node and awaits an acknowledgement as set forth in blocks 278 through 286 signifying that the verify portion of the link-up sequence is complete. If, on the other hand, either of the nodes does not receive the information in the verify cycle to complete the verify process, an indication of connectivity not found is returned, as shown in FIG. 3, to the network controller as part of its program and the link-up process is started at the next appropriate time for such a procedure.

From the above, it will be realized that the verify process is primarily a handshaking process in which each node says in effect, "I heard you", "I heard you say that you heard me", "frequency 'X' is better than the other of the two that you sent me and thus, this will be the traffic frequency from you to me". At the conclusion of the verify activity of FIG. 11, both nodes have agreed upon the frequency to be used for traffic and the frequency to be considered as the first alternate in case of deterioration of the frequency band selected for traffic. The algorithm also includes procedures for determining the second alternate as set forth in block 276 of FIG. 11. This second alternate will typically be from received data if signals were received on enough different frequencies but may be on a purely empirical basis if only one or two frequencies were actually received by a given node.

The network controller 10 then proceeds to the traffic phase 44 of FIG. 3 and as set forth in the flow diagram of FIG. 12. In the traffic mode 44 of FIG. 3 and as set forth more fully in FIG. 12, the same five second time slot structure is maintained as set forth in the traffic packet 122 of FIG. 5. However, rather than two data sections or packets as were used in the probe and verify packets of FIG. 5, a short or approximately one-quarter second preamble is used with the remaining four and three-quarters seconds available for user data. The user messages are processed by the network controller 10 and forwarded to the modem 12 for transmission. If the message is shorter than the available packet space, bit stuffing may be used to complete the packet. If the message is longer than one packet, it may be arranged into multiple packets by the net controller 10 and sent in as many time slots as required and reassembled by the net controller in the receiving node of the system.

During traffic operation, measurements continue to be made on the quality of each received packet.

As set forth in FIG. 12, the network controller is on a periodic basis checking to see whether there is traffic in queue in accordance with decision block 294, and at the appropriate time listens for any incoming packets in accordance with block 298. The decision block 300 not only is checking the circuit itself, but is checking the quality of the communication link via the bit error rate, etc., of the incoming traffic. If there is a problem, the system proceeds immediately to the immediate maintenance routine of FIG. 13. If the maintenance process 46 of FIG. 3, and as detailed in the flow diagram of FIG. 13, cannot produce a "fix" which will reestablish communications, the system will return to the link-up process 42 for reestablishing communications at the next appropriate time. However, if conditions can be reestablished by changing data rate or changing frequency as set forth in the various blocks of FIG. 13, these actions will be accomplished and the system will be returned to the traffic mode 44 of FIG. 3 and the flow diagram set forth in FIG. 12. As set forth in the flow diagram of FIG. 12 for the traffic phase 44 of FIG. 3, the system on every sixteenth cycle proceeds to the scheduled maintenance routine of FIG. 14 as part of a regular checkup procedure. This procedure comprises sending both of the alternate frequencies in one time slot as set forth in the maintenance packet of FIG. 5 and as set forth in the block 363 of FIG. 14 if the status of the link at the time maintenance begins indicates that the traffic was good. If a check indicates that the traffic was bad, the same two frequencies are still used, but a part of the data packet, such as 90 and 96 of FIG. 5, will contain information suggesting a change in frequency for traffic to alternate number 1.

If the decision block 369 of FIG. 14 finds that the change frequency flag was not set, the system uses another minor cycle at the traffic frequency to both send and receive information as set forth in blocks 377 and 379 in the data portion of the maintenance packets. If the change frequency flag was set, a simplified version of the verify routine is used to establish alternate number 1 as the new traffic frequency before returning to the traffic phase block 44 of FIG. 3 or the probe phase of FIG. 9, and is set forth in the flow diagram of FIG. 12.

If, according to the decision block 304 of FIG. 12 in the traffic phase, there is a determination that the link has been idle of traffic both being transmitted and received for more than four minor cycles, the system proceeds to the idle link analysis routine of FIG. 15 to evaluate other potential frequencies. As part of the idle link analysis process, the information ascertained is stored within the node and distributed to other nodes throughout the system for use as communication conditions change.

From the above, it will be realized that there is no centralized control. Each of the nodes acts independently and performs actions based upon distributed and commonly held protocols. To operate in this manner an accurately known system time is required. This time can be obtained in any of several approaches as outlined previously. The connectivity state of any given link at any given time is independent from the state of any other link in the network.

Although it is believed that the present specification and drawings fully and accurately describe the system and provide sufficient information so that anyone skilled in the art can practice the inventive concept, we have additionally included "Unpublished Appendix A", (as an appendice to remain unprinted), a copy of the working specification used to write the program code to enable a computer to operate as the network control 10 of FIG. 1 and perform the functions of the flow diagrams 8 through 15 detailing the phases of FIG. 3 to even further facilitate the understanding of the inventive concept.

It should be realized by those skilled in the art that the single embodiment illustrated by the drawings and the specification comprise only one solution to the various inventive concepts presented and that we wish to be limited not by the specific embodiment but only by the scope of the appended claims, wherein we claim:

1. A node for use in a HF multinode network wherein communication between other nodes in a set of N nodes is subject to natural vagaries such as fading and absorption and wherein each node in the network establishes communication with another node in the set of nodes in a probe mode, exchanges data in a traffic mode and maintains communication in a maintenance mode comprising, in combination:

N time slot multiplexing transmitter first means;
N time slot multiplexing receiver second means;
memory storage third means; and
control means, connected to said first, second and third means, comprising,
    fourth means for transmitting a predetermined set of probe frequencies to a given further node at the next one of a predetermined set of times by the given further node,
    fifth means for receiving a predetermined set of probe frequencies from the given further node and recording the quality of each probe frequency of the set received,
    sixth means for transmitting the recorded quality of the received probe frequencies to the node from which they were received,
    seventh means for storing the quality of probe signals received by other nodes which exceed predetermined minimum requirements for use in determining the frequencies to be used in communication with each assigned other node during further communications with that node,
    selection eighth means for selecting the frequencies attributed to the highest quality signal of those stored by said seventh means to be used in a communication mode with a given node wherein the frequencies selected may be different for each other node being communicated with,
    detection ninth means for switching to the transmission mode for communication with each node in the set of nodes after successful selection of a transmission frequency exceeding the predetermined minimum requirements,
    switching tenth means for temporarily substituting a maintenance mode of communication with each node in the set of nodes, with whom successful communications have been established, on a periodic basis to establish to desirability of using a frequency other than the present for the transmission mode,
    eleventh means for communicating a transmission mode frequency change sequence to a given node in the set of nodes upon establishment by said tenth means that such a change is will provide a desirably higher quality level of communication, and
    monitoring twelfth means to return the system to a probe mode for a given node in the set of nodes when transmission errors exceed a predetermined value.

2. The method of establishing and maintaining radio communication between any two nodes in a spaced apart network of T nodes comprising, the steps of:
    establishing a set of internode connections where each node is directly connected only to an assigned set N of other nodes where N is less than T and where communication to nodes outside the set N is via the set N;

independently establishing a transmission frequency with each node of the set of nodes by sending a predetermined set of trial transmission frequencies at predetermined times as part of a probe mode, in accordance with information stored in each node of the network, storing quality information relative each received signal and transmitting all previously dynamically stored signal quality information at each subsequent trial transmission frequency;

storing the information received as to the quality of various transmitted frequency signals and independently selecting the frequency having the highest quality to be used in a transmission mode with each of the nodes in the set where the frequencies sent and received may be different for each node of the set N and may be different for sending and receiving with respect to a given pair of nodes in the set N;

normally transmitting packets of information to any other node in the network of T nodes via one of the set of N nodes in a transmission mode;

periodically trading packets of information in a maintenance mode, interspersed with the packets of the transmission mode, concerning any stored information pertaining to the connectivity of any node with any other node, whereby each node builds and maintains a dynamic table of information for the purpose of determining the best next node in the path toward the ultimate destination; and transmitting alternate frequency signals, from said predetermined set of trail frequencies, during maintenance mode time periods for continuously updating stored signal quality information whereby the transmission frequency automatically can be changed in accordance with predetermined parameters without having to revert to the probe mode.

3. The method of establishing radio communication between any two nodes in a spaced apart finite network of T nodes comprising, the steps of:

establishing a set of internode connections where each node is directly connected only to an assigned finite set N of other nodes where N is less than T and where communication to nodes outside the set N is via the set N;

independently establishing a transmission frequency with each node of the set of nodes by sending a predetermined set of trial transmission frequencies at predetermined times as part of a probe mode, in accordance with information stored in each node of the network, storing quality information relative each received signal and subsequently transmitting all previously stored signal quality information at each subsequent trial transmission frequency in a further set of transmissions; and storing at each node the information received as to the quality of various transmitted frequency signals and selecting from information stored at each node the frequency having the highest quality to be used in a transmission mode with each of the nodes in the set where the frequencies sent and received may be different for each node of the set N and may be different for sending and receiving with respect to a given pair of nodes in the set N.

4. The method of maintaining radio communication between any two nodes in a set of N nodes in a spaced apart network of T nodes comprising, the steps of:

storing information as to the quality of various transmitted frequency signals between each of T nodes in a network;

establishing a set of internode connections where each node is directly connected only to an assigned set N of other nodes where N is much less than T and where communication to nodes outside the set N is via the set N;

normally transmitting packets of information to any other node in the network of T nodes via one of the set of N nodes in a transmission mode where the transmission frequency may be different for each one of the set of N nodes and may be different for sending and receiving with respect to a given pair of nodes in the set N;

periodically trading packets of information in a maintenance mode, interspersed with the packets of the transmission mode, concerning any stored information pertaining to various frequency signal quality between any node and any other directly connected node, whereby each node maintains a dynamic table of information; and transmitting alternate frequency signals during maintenance mode time periods for continuously updating stored signal quality information.

5. A node for greater than line of sight communication with another node where the communication is subject to natural vagaries such as fading and absorption comprising, in combination:

N time slot multiplexing transmitter first means;
N time slot multiplexing receiver second means;
memory storage third means; and
control means, connected to said first, second and third means, comprising, fourth means for transmitting a predetermined set of probe frequencies to the other node at a time expected by the given other node, fifth means for receiving a predetermined set of probe frequencies from the other node and recording the quality of each probe frequency of the set received, sixth means for transmitting the recorded quality of the received probe frequencies received to the node from which they were received, seventh means for storing the quality of probe signals received by the other node which exceed predetermined minimum values for use in determining the frequencies to be used in communication with each said other node during further communications with the node, selection eighth means for selecting the frequencies attributed to the highest quality signal of those stored by said seventh means to be used in a communication mode with a given node, detection ninth means for switching to the transmission mode for communication with said other node after successful selection of a transmission frequency exceeding the predetermined minimum requirements, switching tenth means for temporarily substituting a maintenance mode of communication with said other node, on a periodic basis, to establish the desirability of using a frequency other than the present for the transmission mode, eleventh means for communicating a transmission mode frequency change sequence upon establishment by said tenth means that such a change will provide a desirably higher quality level of communication, and monitoring twelfth means to return the node to a probe mode whenever transmission errors exceed a predetermined value.

6. A method of establishing and maintaining VHF beyond line of sight radio communication between two transceiver nodes, comprising the steps of:

establishing an initial transmission frequency in each direction between the nodes by sending a predetermined set of trial transmission frequencies at predetermined times as part of a probe mode, in accordance with information stored in each node, storing quality information relative each received signal and transmitting all previously stored signal quality information at each subsequent trial transmission frequency;

storing the information received as to quality of various transmitted frequency signals and selecting the frequency having the highest quality to be used in a transmission mode with the other node where the frequencies sent and received may be different;

normally transmitting packets of user information to said other node in a transmission mode;

periodically trading packets of information in a maintenance mode, interspersed with the packets of the transmission mode, concerning any stored information pertaining to the connectivity of either node, whereby each node builds and maintains a dynamic table of connectivity information; and transmitting alternate frequency signals during transmission mode time periods for continuously updating stored signal quality information whenever it is determined that there is no user traffic to be transmitted.

7. The method of maintaining communications between two transmitter/receiver units operating in a packet message mode comprising the steps of:

time interspersing maintenance transmission trial data rate packets with message packets where the data rate of the maintenance packets differs from that of the current message packets;

measuring the quality of the maintenance packets of various trial data rates received;

transmitting the measured values of the quality of received trial data rate maintenance packets to the unit sending same; and adjusting the data rate of the message packets to a maximum value while maintaining at least a given minimum message quality.

8. The method of maintaining beyond line of sight VHF radio communication between two spaced apart nodes comprising, the steps of:

storing information as to the quality of various transmitted frequency signals between each of the nodes;

normally transmitting packets of information in a transmission mode where the transmission frequency may be different for sending and receiving;

periodically trading packets of information in a maintenance mode, interspersed with the packets of the transmission mode, concerning any stored information pertaining to various frequency signal quality, whereby each node maintains a dynamic table of information; and transmitting alternate frequency signals during maintenance mode time periods for continuously updating stored signal quality information.

9. A node for greater than line of sight communication with another node where the communication is subject to natural vagaries such as fading and absorption comprising, in combination:

N time slot multiplexing transmitter first means;
N time slot multiplexing receiver second means;
memory storage third means; and
control means, connected to said first, second and third means, comprising, fourth means for transmitting a predetermined set of probe frequencies to the other node at a time expected by the given other node, fifth means for receiving a predetermined set of probe frequencies from the other node and recording the quality of each probe frequency of the set received, sixth means for transmitting the recorded quality of the received probe frequencies received to the node from which they were received, seventh means for storing the quality of probe signals received by the other node which exceed predetermined minimum requirements for use in determining the frequencies to be used in communication with each said other node during further communications with that node, selection eighth means for selecting the frequencies attributed to the highest quality signal of those stored by said seventh means to be used in a communication mode with a given node, detection ninth means for switching to the transmission mode for communication with said other node after successful selection of a transmission frequency exceeding the predetermined minimum requirements, switching tenth means for temporarily substituting a maintenance mode of communication with said other node, on a periodic basis, to establish to desirability of using a data rate other than the present for the transmission mode, and eleventh means for communicating a transmission mode data rate change upon establishment by said tenth means that such a change will be desirable.

10. The method of automatically establishing communication between two nodes in a communications network where each of said two nodes has stored information of the trial frequencies stored internally by the other node of said two nodes and further has information stored internally as to the time, relative an established reference, that a set of trial frequencies will be transmitted comprising the steps of:

a. transmitting each frequency of a first set of trial frequencies at predetermined relative times to the other node of said two nodes in a probe phase;

b. recording the quality of any signals received at expected times during the probe phase;

c. transmitting the signal quality recorded results of each trial frequency attempted in step (b) at each of the frequencies used in step (a) in a response phase;

d. storing signal quality information, as to the best quality signals of any remote node received signals, received from the other node of said two nodes as a result of the transmissions of step (a), at each of the receive signal frequencies previously used in step (b) as part of the response phase;

e. transmitting acknowledgement messages to and receiving acknowledgement messages from the other node of said two nodes for establishing the traffic frequency each node will use in communicating with the other of said two nodes in a verify phase each receiving node thereby establishing the frequency that the other node shall use in its communicating transmissions; and f. repeating steps (a) to (e) for new sets of stored trial frequencies if either node fails to receive signals of sufficient quality to sustain communication in step (b).

11. A node for use in a HF multinode network wherein communication between other nodes in a set of nodes is subject to natural vagaries such as fading and absorption and wherein each node in the network establishes communication with another node in the set of nodes in a probe mode, exchanges data in a traffic mode and maintains communication in a maintenance mode comprising, in combination:

N time slot multiplexing transmitter first means;
N time slot multiplexing receiver second means;
memory storage third means; and
control means, connected to said first, second and third means, comprising,
  fourth means for transmitting a predetermined set of probe frequencies to a given further node at a time expected by the given further node,
  fifth means for receiving a predetermined set of probe frequencies from the given further node and recording the quality of each probe frequency of the set received,
  sixth mean for transmitting the recorded quality of the received probe frequencies to the node from which they were received,
  seventh means for storing the quality of probe signals received by other nodes which exceed predetermined minimum requirements for use in determining the frequencies to be used in communication with each assigned other node during further communications with that node,
  selection eigth means for selecting the frequencies attributed to the highest quality signal of those stored by said seventh means to be used in a communication mode with a given node wherein the frequencies selected may be different for each other node being communicated with,
  detection ninth means for switching to the transmission mode for communication with each node in the set of nodes after successful selection of a transmission frequency exceeding the predetermined minimum requirements,
  switching tenth means for temporarily substituting a maintenance mode of communication with each node in the set of nodes, with whom successful communications have been established, on a periodic basis to establish the desirability of using a data rate other than the present for the transmission mode,
  eleventh means for communicating a transmission mode data rate change sequence to a given node in the set of nodes upon establishment by said tenth means that such a change will provide a desirably higher quality level of communication, and
  monitoring twelfth means to return the system to a probe mode for a given node in the set of nodes whenever transmission errors exceed a predetermined value and cannot be corrected by changing transmission parameters.

12. A node for use in a HF multinode network wherein communication between other nodes in a set of nodes is subject to natural vagaries such as fading and absorption and wherein each node in the network establishes communication with another node in the set of nodes in a probe mode, exchanges data in a traffic mode and maintains communication in a maintenance mode comprising, in combination:

N time slot multiplexing transmitter first means;
N time slot multiplexing receiver second means;
memory storage third means; and
control means, connected to said first, second and third means, comprising,
  fourth means for transmitting a predetermined set of probe frequencies to a given further node at a time expected by the given further node,
  fifth means for receiving a predetermined set of probe frequencies from the given further node and recording the quality of each probe frequency of the set received,
  sixth means for transmitting the recorded quality of the received probe frequencies to the node from which they were received,
  seventh means for storing the quality of probe signals received by other nodes which exceed predetermined minimum requirements for use in determining the frequencies to be used in communication with each assigned other node during further communications with that node,
  selection eighth means for selecting the frequencies attributed to the highest quality signal of those stored by said seventh means to be used in a communication mode with a given node wherein the frequencies selected may be different for each other node being communicated with,
  detection ninth means for switching to the transmission mode for communication with each node in the set of nodes after successful selection of a transmission frequency exceeding the predetermined minimum requirements,
  switching tenth means for temporarily substituting a maintenance mode of communication with each node in the set of nodes, with whom successful communications have been established, on a periodic basis to establish the desirability of using a frequency other than the present for the transmission mode,
  eleventh means for communicating a transmission mode frequency change sequence to a given node in the set of nodes upon establishment by said tenth means that such a change will provide a desirably higher quality level of communication, and
  monitoring twelfth means to return the system to a probe mode for a given node in the set of nodes when transmission errors still exceed a predetermined value after attempts have been made to reduce same by changing system transmission parameters.

13. The method of establishing radio communication between any two nodes in a spaced apart network of T nodes for the transmission of data packets comprising, the steps of:
  initiating transmissions from a transmitter node to a given receiver node based on a predetermined set of trial transmission frequencies sent at predetermined times as part of a probe mode where said set of trail transmission frequencies and predetermined times are known to said receiver node;

storing information relative the quality of each signal received of the set of trial transmission frequencies at the receiver node;

determining at the receiver node which of the received signals is best suited for the transmission of data packets based on the stored information; and transmitting instruction information from the receiver node to the transmitter node as to the frequency to be used by the transmitter during the transmission of data packets whereby the frequency used by a transmitter in each of the two nodes is selected by and controlled by the other of the two nodes.

14. The method of selecting a usuable communication channel frequency from a range of frequencies including HF (high frequency) and VHF (very high frequency) as part of a procedure for establishing and maintaining beyond line of sight radio communication between two transceiver nodes, comprising the steps of:

establishing an initial transmission frequency in each direction between a pair of nodes by sending a predetermined set trial transmission frequencies covering the range of HF and VHF as part of a probe mode;

storing quality information relative each signal received as part of the probe mode procedure;

transmitting stored signal quality information to the other node of said pair of nodes along with an indication of the frequency the other node is to use for normal communications as part of a verify mode, the result being that the frequencies sent and received, by one node of the pair of nodes for normal communication of data packets, may be different;

normally transmitting packets of user information to said other node in a transmission mode;

periodically trading packets of information in a maintenance mode, interspersed with the packets of the transmission mode, concerning any stored information pertaining to the connectivity of either node, whereby each node builds and maintains a dynamic table of connectivity information; and transmitting alternate frequency signals during transmission mode time periods for continuously updating stored signal quality information whenever it is determined that there is no user traffic to be transmitted.

15. The method of selecting a usable communication channel frequency from a range of frequencies including HF (high frequency) and VHF (very high frequency) as part of a procedure for establishing and maintaining beyond line of sight radio communication between two transceiver nodes, comprising the steps of:

establishing an initial transmission frequency in each direction between a pair of nodes by sending a predetermined set of trial transmission frequencies covering the range of HF and VHF as part of a probe mode;

storing quality information relative each signal received as part of the probe mode procedure; and transmitting stored signal quality information to the other node of said pair of nodes along with an indication of the frequency that the other node is to use for normal communications as part of a verify mode, the result being that the frequencies sent and received, by one node of the pair of nodes for normal communication of data packets, may be different, and the frequencies sent by each node of the pair is selected and controlled by the receiving node.

16. The method of selecting a usable data rate and communication channel frequency from a range of frequencies including HF (high frequency) and VHF (very high frequency) as part of a procedure for establishing and maintaining beyond line of sight radio communication between two transceiver nodes, comprising the steps of:

establishing an initial transmission frequency in each direction between a pair of nodes by sending a predetermined set of trial transmission frequencies having data occuring at a given rate and covering the range of HF and VHF as part of a probe mode;

storing BER (bit error rate) signal quality information relative each signal received as part of the probe mode procedure; and transmitting stored signal quality information to the other node of said pair of nodes along with an indication of the data rate that the other node is to use for normal communications as part of a response/verify mode, the result being that the data rates sent and received, by one node of the pair of nodes for normal communication of data packets, may be different, and the frequencies sent by each node of the pair is selected and controlled by the receiving node.

* * * * *